Patented Feb. 19, 1935

1,991,769

UNITED STATES PATENT OFFICE 1,991,769

UTILIZATION OF COTTON PLANT

Gideon Howard Palmer, East Orange, N. J.

No Drawing. Application May 27, 1933,
Serial No. 673,309

10 Claims. (Cl. 92—9)

One of the objects of my invention relates to the treatment, purification and utilization of the cotton plant or portions thereof after the cotton has been obtained therefrom, that is, of the cotton, stalk, branches and other portions thereof which have grown above the ground, after the matured cotton has been harvested therefrom.

Another object of my invention comprises such cotton plant or portions thereof or sections taken therefrom, so as to transform such selected portions into a purified cellulosic substance suitable for use in the arts for esterification and etherification purposes only, and not for utilization in the manufacture of paper.

Another object of my invention is the transformation of such purified cellulose obtained from the cotton plant structure into xanthated esters such as viscose, for the commercial formation of products for which viscose is normally employed at the present time, such as circular or other shaped filaments, films and sheets.

Other objects of my invention will appear during the description therein and as set forth in the appended claims, one of the principal objects being the treatment and utilization of discarded portions of the cotton plant after the cotton has been removed therefrom. It has been stated that the cotton portion of the cotton plant forms only about 2 percent by weight of the plant as a whole, that is, in the normal growing of cotton only one part in about 50 is utilizable. And it has further been stated that there is available in the United States only something like five hundred million pounds of cotton plant annually, which at the present time is substantially waste material.

Furthermore this waste material, left on the ground as is usually the custom, is a distinct menace to future crops of cotton in that it harbors the cotton boll weevil in some of its resting forms.

In the United States and elsewhere, the main stem of the cotton plant grows generally to a height of from three to six feet and has numerous branches. The main stem is largely composed of bark, woody tissue and a central pithy portion. The tops of the plant and the numerous small branches contain relatively smaller proportions of woody fiber which, considering the large annual tonnage available of the cotton plant, may be dispensed with in my process if desired, harvesting of the plant at the close of the cotton-picking operation being confined in the main, to a recovery of the stems.

Usually, after the seed cotton has been picked, the stalks and remainder of the plant are abandoned, providing food and a resting place for the boll-weevil and cotton worm, and a place in which they live during the winter.

Therefore any process evolved for the commercial utilization of these stalks has an entomological value, the removal of this refuse in the fall is one of the most important procedures in cotton farming.

The present invention therefore, contemplates harvesting the tops of the plants in an approved manner and afterwards cutting off the plant close to the ground, then separating those portions desired for the purposes of this invention as raw material in any approved manner and by ways now known.

For purposes of description, the subject matter of this invention may be subdivided under two headings, the first, transformation of raw cotton stalk into purified cellulose suitable for the purposes of the second heading, the preparation of viscose solution therefrom for use in the arts.

I. *Preparing purified cellulose.*—The portions of the cotton plant selected for treatment according to my invention are brought into a physical state suitable for treatment, preferably in small pieces, and are then immersed in a 1%–2% alkali metal hydroxide solution either at ordinary temperatures or heated to below 100° C. (all degrees stated herein are centigrade) and allowed to soak therein for several hours or over night. This loosens the outer or bark portion and so softens the same that it may be readily removed in a mechanical manner and is discarded. The cotton plant substantially freed from bark is next introduced into a heating vessel either open but preferably closed as an autoclave, and heated at normal or elevated pressure with a solution of alkaline character in order to remove cementitious substances, gummy and mucilaginous matter, hemi-cellulose and non-resistant cellulosic bodies to separate the resistant or alpha-cellulose portion in a condition of purity suitable for the purposes of further employment as detailed herein.

Many are the attempts that have been made to recover and utilize the fiber from the cotton plant for paper pulp and for other uses, but these efforts insofar as I am aware, have been unsuccessful from a commercial viewpoint, mainly due to the fact that such drastic treatment has been necessary to remove the non-resistant celluloses and encrusting materials from the desired alpha-cellulose portion, that the latter has been attacked, depolymerized or otherwise degraded so that either an inferior yield of cellulose was obtained, or a yield of inferior cellulose for the purposes comprehended in this invention, or both, or else the process was found to be unduly expensive considering the amount of suitable purified cellulose obtained.

The present to be described process obviates the disadvantages above indicated and others, and results in the obtainment of a highly purified cellulose of maximum alpha-cellulose content, and especially suitable for production of a high grade of viscose by virtue of its ready reactivity under the processes prevailing in general viscose formation.

For the preliminary purification of the cotton plant stock, I prefer to heat the same to 100–145° with 1.5% aqueous ammonia containing 0.5% triethanolamine commercial, based on the weight of the stock calculated on the dry weight. Heating is continued for 1–3 hours, the contents of the vessel allowed to cool below the boiling point of water, and the liquid portion then withdrawn and discarded. The stock is washed with hot water until substantially no more odor of ammonia is detectable. The object of this treatment is to emulsify, saponify, soften and remove undesirable components in such a bland manner that the alpha-cellulosic and resistant cellulosic portion is substantially conserved without degradation.

At the close of the washing operation, the stock, still remaining in the heating container as autoclave, is covered with an aqueous solution containing 1% (all by weight on the original cellulose) sodium silicate commercial, potassium oleate 1%, sodium hydroxide 2.5% and sodium carbonate 1.5%, these quantities being susceptible to wide variation depending upon the length of time of heating, the temperature to which the mass is exposed, and the degree of purification of the stock in the previous boil-off operation. The addition of a relatively small amount of commercial triethanolamine to the above formula has been found beneficial in general, it having been found that the lubricating and emulsifying nature of the ethanolamine in an alkaline medium as above indicated, is an excellent material to assist in the separation of the alpha-cellulose from cotton plant stock without degrading the same, while at the same time, it tends to loosen up non-alphacellulosic materials normally present, so that their removal from the alpha-cellulose is greatly facilitated. Heating at 100°–125° for 1 to 3 hours has been found to sufficiently disintegrate the stock without appreciably attacking the alpha-celluosic portion. At the close of the heating operation, the liquid portion is run off, the stock washed with hot water until reactants are removed, and then treated in the cold with 1%–3% mineral acid aqueous solution as sulfuric acid for 12–24 hours, washed to neutrality and placed in a beater of the usual paper making type.

After beating for 1–2 hours or until the fibers appear sufficiently disintegrated, the stock in suspension is passed the usual screener with plates of (say) from 0.09 to 0.11 inch slits in diameter to a chest, where it is agitated as by compressed air and then cast either directly into sheets or into a continuous sheet which is afterwards cut into the size sheet desired. The pulp in sheet form is preferably dried at a comparatively low temperature as not to exceed 60°, and may or may not be subjected to a bleaching treatment as desired.

A composite result of several analyses of the purified cellulose thus obtained, based upon the bone dry condition shows the composition as follows:—

| | Per cent |
|---|---|
| Moisture (loss at 105°) | 1.5 |
| Ash (inorganic portion) | 0.28 |
| Water-soluble | 0.24 |
| Fat, wax, (Soxhlet extraction) | 0.45 |
| Alpha-cellulose | 89+ |

When the identical method of procedure above described is carried out, but omitting the use of triethanolamine or other ethanolamine, the percentage of alpha-cellulose in the finished product is lowered by several percent, in one instance by about 4% by weight.

I have found that in order to obtain a yield of substantially maximum amount of alpha-cellulose from cotton plant stock, it is imperative that the stock be subjected to purification steps of the minimum in drastic nature, on account of the ready reactivity of cotton stock alpha-cellulose, and my search of the literature of previous attempts and processes to economically utilize this source of cellulose has resulted in failure through insufficient appreciation of this fundamental fact, and that by the inclusion of ethanolamine or of a body of similar physical and/or chemical effect upon the material being treated, disintegration and separation is more readily and less drastically effected and with a minimum loss of the alpha-cellulose obtainable therefrom.

II. *Preparing viscose.*—The sheets of purified cellulose from cotton plant stock and of uniform thickness and relative porosity and hence penetrability by reagents, are first placed in a temperature and moisture controlled room, whereby a 5–6% moisture results in the sheets at a temperature of 18°±1°, the sheets having been previously cut to the size desired.

Said sheets are then introduced into a mercerizing or "steeping" apparatus, and an excess of aqueous sodium hydroxide solution of about 18.4% absolute NaOH run in to immersion of the sheets, the temperature of the alkaline solution being preferably within 0.2° of 17.5°, which is materially lower than the usual mercerization temperature for suitable alkalicellulose for viscose formation wherein wood pulp or cotton cellulose in the purified condition is used for the cellulose.

My explanation for this material departure from well established practice, is that alpha-cellulose from cotton stocks and cotton plant is more readily susceptible to chemical treatment by virtue of its comparatively augmented reactivity in comparison with other forms of cellulose used in this art at the present time. And in many of the published processes for conversion of cellulose crude as cotton plant into utilizable cellulose, no attempt appears to have been made to so conduct the various steps of purification so as to conserve to the maximum the amount of alpha-cellulose present in the final product, and I attribute the unusually low yield of cellulosic material obtained by them, in general, to improper or inadequate appreciation of this fact of the ultra-susceptibility of the alpha-cellulosic portion of cotton plant to chemical and physical treatment, and its heretofore lack of appreciation by workers in this field.

The sodium hydroxide solution is allowed to contact with the cellulose sheets for less than 1.5 hours, and usually less than 1¼ hours, whereas the normal practice with cotton is for immersion in the alkali solution for 2 to 3 hours. In either event, circulation of alkali solution during the mercerization period is considered advisable. The excess solution is expressed from the sheets until the same weighs about 2.85 times the weight of the original cellulose taken, then shredded or disintegrated at a temperature of about 17° (the temperature of reaction being controlled by artificial refrigeration meanwhile) until the particles obtained are about 1–2 square millimeters area.

The shredded alkalicellulose ("crumbs") are then transferred to metal receptacles with tightly fitting covers, about 35–45 pounds per receptacle, and as soon as possible placed in a temperature controlled room at about 17°–17.5° (usually ageing temperature 19.5°) for 40–45 hours (usual ageing period 50–65 hours), the contents of the cans being shaken at intervals of several hours in the interim.

The light, fluffy product is then placed in a closed, rotatable container, spherical, hexagonal or octagonal, and carbon bisulfide in vapor form sprayed in while the container is in motion (about 3–5 R. P. M.), the amount of bisulfide admitted being about 12% of the original weight of the cellulose taken.

When the contents of the xanthator or churn has attained that shade of orange usually spoken of as carrot color which experience indicates the period of maximum xanthation has been reached, and which with cotton plant alphacellulose is usually reached in 50–55 minutes (normal with other celluloses 65–80 minutes), vacuum is applied to the churn to remove free carbon bisulfide vapors, and the contents of the churn transferred to a covered receptacle with rotating or stirring device therein, wherein dilute caustic soda is placed of concentration and volume so that the dissolved xanthate (now usually spoken of as viscose) after stirring for 1.5–2 hours, has a cellulosic content of about 6.8% and an alkalinity of 6.5% or thereabouts expressed as sodium hydroxide. Upon examination of this "solution" after proper filtration, there should be apparent on low power magnification, none, or at most but a trace, of nearly colorless and transparent undissolved mucilaginous particles.

The dissolved xanthate (viscose solution) is then transferred to the "ripening" room, and there kept within 0.2° of 19° for about 85 hours (normal ripening period about 105–120 hours) and until a sample withdraw, diluted with distilled water and treated with 10% acetic acid in the usual manner, gives an acetic test of 8.–8.5 cc., thus indicating that the viscose has reached that degree of ripening or stage of depolymerization optimum for spinning purposes, for casting into films or for extrusion into sheets of indeterminate length. The solution is then projected through the determined orifices into a suitable setting or coagulating medium, and from this point onward treated by methods now known in the art.

The above method is detailed merely for illustrative purposes only, and may be varied within wide limits of manipulation and the factors of time, concentration and temperature without departing from the essence of my invention, as is to be understood by those skilled in the art to which this invention appertains. But, in contradistinction to the treatment of purified wood pulp and purified cotton cellulose as linters intended to be used for the same or analogous purposes, it is to be noted that the various steps considered optimum in the present day commercial practice of viscose formation utilizing cotton cellulose or a mixture of cotton cellulose and wood cellulose do not yield a product of optimum and desirable properties when applied to cotton plant cellulose properly purified or alphacellulose obtained from the same.

And conversely, due to the relatively ultra-susceptibility of cotton plant cellulose over other celluloses or cellulose mixtures now employed for the commercial preparation of viscose for the uses as herein set forth, it is obvious that in general, in manipulating the same for viscose production in the several approved steps necessary for that conversion, the concentrations in general are lower, the temperatures lower, the ageing and ripening periods considerably abbreviated, and other basic factors are materially modified to accord with the difference in the original cellulose.

The word "cellulose" as is understood, is a generic name applied to a class of bodies of the same aggregate formula but differing fundamentally in their susceptibility to attack by reagents and the properties of the compounds formed as the result of such treatment, especially in the properties of their esters and ethers of solubility, tensile strength, elasticity, stability and viscosity. This is especially recognized in the industry employing some form of viscose, as is shown by the fact that wood pulp cellulose and cotton cellulose in the purified condition are used, but the steps in the treatment vary considerably due to these fundamental differences in reactivity and the physical constants of the products formed therefrom.

I have found, therefore, as the culmination of my researches, that another form or species or kind of cellulose or cellulosic material is obtainable from the proper treatment of cotton plant, and have set forth herein approved methods of obtaining said cellulose or cellulosic material of a high degree of purification and the transformation of the same by a process essentially different in its working conditions from those now used in the viscose industry, which means from those used in the transformation of wood cellulose and cotton cellulose into viscose of optimum physical characteristics for the purposes intended, and have set forth those conditions and those fundamental variations in the respective steps whereby such cellulose may be used under the most approved conditions.

Therefore, what I claim is:—

1. A process for the utilization of cotton plant comprising bringing the cotton plant into the physical condition desired immersing in weak alkali metal hydroxide solution then heating with aqueous ammonia solution containing triethanolamine running off mother liquor washing to neutrality, then heating with an aqueous solution containing sodium silicate, potassium oleate, sodium hydroxide, sodium carbonate to which may be added a relatively small amount of triethanolamine and heating above 100° then washing with hot water until reactants are removed, finally treating in the cold with diluted mineral acid for at least twelve hours, then washing until neutral, beating and casting into sheets.

2. A process for the utilization of cotton plant after the cotton has been obtained therefrom comprising bringing the cotton plant into a state of subdivision mechanically immersing in one to two per cent alkali metal hydroxide solution then heating above 100° with aqueous ammonia solution containing triethanolamine for one to three hours running off mother liquor washing to neutrality, then heating with an aqueous solution containing sodium silicate, potassium oleate, sodium hydroxide, sodium carbonate to which may be added triethanolamine and heating above 100° for one to three hours, then washing with hot water until reactants are removed, finally treating in the cold with one to three per cent mineral acid for twelve to twenty-four hours then washing until neutral, beating and casting into sheets.

3. A process for the preparation of highly purified cellulose from cotton plant comprising bringing the cotton plant into the physical condition desired immersing in one to two per cent alkali metal hydroxide solution for several hours then heating above 100° with about 1.5% aqueous ammonia solution containing about 0.5 per cent triethanolamine for several hours running off mother liquor washing to neutrality, then heating with an aqueous solution containing sodium silicate, potassium oleate, sodium hydroxide, sodium carbonate and heating above 100° then washing with hot water until reactants are removed, finally treating in the cold with one to three per cent sulfuric acid for at least twelve hours, then washing until neutral, beating and casting into sheets.

4. A process for the preparation of alpha-cellulose from cotton plant comprising bringing the cotton plant into a state of subdivision mechanically immersing in weak alkali metal hydroxide solution then heating with aqueous ammonia solution containing triethanolamine running off mother liquor washing to neutrality, then heating with an aqueous solution containing sodium silicate, potassium oleate, sodium hydroxide, sodium carbonate and heating above 100° for one to three hours then washing with hot water until reactants are removed, finally treating in the cold with diluted mineral acid, for twelve to twenty-four hours, then washing until neutral, beating and casting into sheets.

5. A process for the purified cotton plant cellulose comprising bringing the cotton plant into the physical condition desired immersing in one to two per cent alkali metal hydroxide solution then heating above 100° with aqueous ammonia solution containing triethanolamine for one to three hours running off mother liquor washing to neutrality, then heating with an aqueous solution containing sodium silicate, potassium oleate, sodium hydroxide, sodium carbonate to which may be added a relatively small amount of triethanolamine and heating above 100° then washing with hot water until reactants are removed, finally treating in the cold with one to three per cent mineral acid for at least twelve hours, then washing until neutral, beating and casting into sheets.

6. A process for the utilization of cotton plant comprising bringing the cotton plant into a state of subdivision mechanically immersing in one to two per cent alkali metal hydroxide solution for several hours then heating above 100° with about 1.5 per cent aqueous ammonia solution containing about 0.5 per cent triethanolamine for several hours running off mother liquor washing to neutrality then heating with an aqueous solution containing sodium silicate, potassium oleate, sodium hydroxide, sodium carbonate, to which may be added triethanolamine and heating above 100° for 1-3 hours then washing with hot water until reactants are removed finally treating in the cold with one per cent to three per cent sulfuric acid for 12-24 hours then washing until neutral, beating and casting into sheets.

7. A process for the utilization of cotton plant after the cotton has been taken therefrom comprising bringing the cotton plant into the physical condition desired immersing in weak alkali metal hydroxide solution then heating with aqueous ammonia solution containing triethanolamine running off mother liquor washing to neutrality then heating with an aqueous solution containing sodium silicate, potassium oleate, sodium hydroxide, sodium carbonate, and heating above 100°, then washing with hot water until reactants are removed, finally treating in the cold with dilute mineral acid for at least 12 hours then washing until neutral, beating and casting into sheets.

8. A process for the preparation of highly purified cellulose from cotton plant comprising bringing the cotton plant into a state of subdivision immersing in 1-2% alkali metal hydroxide solution then heating above 100° with aqueous ammonia solution containing triethanolamine for 1-3 hours running off mother liquor washing to neutrality then heating with an aqueous alkali solution containing potassium oleate to which may be added a relatively small amount of triethanolamine and heating above 100° for 1-3 hours then washing with hot water until reactants are removed finally treating in the cold with 1 per cent to 3 per cent mineral acid for at least 12 hours then washing until neutral, beating and casting into sheets.

9. A process for the preparation of alpha cellulose from cotton plant comprising bringing the cotton plant into the physical condition desired immersing in alkali metal hydroxide solution for several hours then heating above 100° with about 1.5 per cent aqueous ammonia solution containing about 0.5 per cent triethanolamine for several hours running off mother liquor washing to neutrality then heating with a solution containing alkali metal silicate, oleate, hydroxide, and carbonate, to which may be added triethanolamine and heating above 100° then washing with hot water until reactants are removed finally treating with 1 per cent to three per cent sulfuric acid for at least 12 hours then washing until neutral, beating and casting into sheets.

10. A process for the preparation of purified cotton plant cellulose comprising bringing the cotton plant material into the desired degree of subdivision immersing in weak alkali metal hydroxide solution then heating with aqueous ammonia solution containing triethanolamine for 1-3 hours running off mother liquor washing to neutrality then heating with an aqueous solution containing sodium silicate, potassium oleate, sodium hydroxide, and sodium carbonate, then heating above 100° for 1-3 hours washing with hot water until reactants are removed finally treating in the cold with dilute mineral acid for 12-24 hours then washing till neutral, beating and casting into sheets.

GIDEON HOWARD PALMER.